(12) United States Patent
Lee et al.

(10) Patent No.: US 12,198,198 B2
(45) Date of Patent: Jan. 14, 2025

(54) METHOD AND APPARATUS FOR ACCIDENTAL NEGLIGENCE EVALUATION OF ACCIDENT IMAGE USING DEEP LEARNING

(71) Applicant: GIST(Gwangju Institute of Science and Technology), Gwangju (KR)

(72) Inventors: Yong-Gu Lee, Gwangju (KR); Sungjae Lee, Gwangju (KR); Hojeong Shin, Gwangju (KR); Jinsu Kim, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 68 days.

(21) Appl. No.: 17/839,191

(22) Filed: Jun. 13, 2022

(65) Prior Publication Data

US 2022/0309593 A1 Sep. 29, 2022

Related U.S. Application Data

(63) Continuation of application No. PCT/KR2020/014494, filed on Oct. 22, 2020.

(30) Foreign Application Priority Data

Dec. 11, 2019 (KR) .................. 10-2019-0164859

(51) Int. Cl.
*G06V 20/56* (2022.01)
*G06Q 40/08* (2012.01)
*G06V 20/70* (2022.01)

(52) U.S. Cl.
CPC ............. *G06Q 40/08* (2013.01); *G06V 20/56* (2022.01); *G06V 20/70* (2022.01)

(58) Field of Classification Search
None
See application file for complete search history.

(56) References Cited

U.S. PATENT DOCUMENTS 8,799,034 B1 * 8/2014 Brandmaier ........... G07C 5/008
   705/4
8,954,226 B1 * 2/2015 Binion .................. G07C 5/008
   701/33.4

(Continued)

FOREIGN PATENT DOCUMENTS

KR  10-2014-0079947 A   6/2014
KR     10-1763389 B1    7/2017

(Continued)

OTHER PUBLICATIONS

S. Urooj, I. Feroz and N. Ahmad, "Systematic literature review on user interfaces of autonomous cars: Liabilities and responsibilities," 2018 International Conference on Advancements in Computational Sciences (ICACS), Lahore, Pakistan, 2018, pp. 1-10 (Year: 2018).*

(Continued)

*Primary Examiner* — Mohammad Z Shaikh
(74) *Attorney, Agent, or Firm* — Studebaker & Brackett PC (57) ABSTRACT

The present disclosure relates to a method and apparatus for split liability assessment of a car accident video using deep learning. The method for split liability assessment of a car accident video using deep learning according to an embodiment of the present disclosure may include: (a) obtaining car accident video data; and (b) outputting accidental split liability information by applying the obtained car accident video data to an accidental split liability determination model.

10 Claims, 5 Drawing Sheets

(56) References Cited

U.S. PATENT DOCUMENTS

| | | | |
|---|---|---|---|
| 9,019,092 B1* | 4/2015 | Brandmaier | B60R 21/0136 |
| | | | 340/436 |
| 9,679,487 B1* | 6/2017 | Hayward | G01C 21/34 |
| 9,972,054 B1* | 5/2018 | Konrardy | G06Q 40/00 |
| 10,121,204 B1* | 11/2018 | Brandmaier | G06Q 40/08 |
| 10,319,039 B1* | 6/2019 | Konrardy | G06Q 40/08 |
| 10,853,882 B1* | 12/2020 | Leise | G06T 5/50 |
| 11,162,800 B1* | 11/2021 | Carbery | G01C 21/28 |
| 11,416,942 B1* | 8/2022 | Leise | G07C 5/0816 |
| 2006/0031103 A1* | 2/2006 | Henry | G06Q 40/08 |
| | | | 705/4 |
| 2010/0256863 A1* | 10/2010 | Nielsen | G07C 5/085 |
| | | | 701/31.4 |
| 2017/0021875 A1* | 1/2017 | Lee | G07C 5/0866 |
| 2018/0075309 A1* | 3/2018 | Sathyanarayana | G05D 1/0055 |
| 2019/0077353 A1* | 3/2019 | Lopez | B60W 50/00 |
| 2019/0244301 A1* | 8/2019 | Seth | G06F 16/73 |
| 2020/0057487 A1* | 2/2020 | Sicconi | G06T 7/254 |
| 2020/0364800 A1* | 11/2020 | Fujii | G06N 20/00 |
| 2021/0004909 A1* | 1/2021 | Farmer | G06Q 40/08 |
| 2021/0097408 A1* | 4/2021 | Sicconi | G06N 20/00 |
| 2021/0171027 A1* | 6/2021 | Kang | H04N 5/265 |
| 2022/0073104 A1* | 3/2022 | Lee | G06N 3/02 |

FOREIGN PATENT DOCUMENTS

| | | |
|---|---|---|
| KR | 10-2018-0129044 A | 12/2018 |
| KR | 10-2019-0119229 A | 10/2019 |
| KR | 10-2019-0126024 A | 11/2019 |

OTHER PUBLICATIONS

S. Ghosh, S. J. Sunny and R. Roney, "Accident Detection Using Convolutional Neural Networks," 2019 International Conference on Data Science and Communication (IconDSC), Bangalore, India, 2019, pp. 1-6. (Year: 2019).*

International Search Report issued in PCT/KR2020/014494; mailed Jan. 20, 2021.

* cited by examiner

METHOD AND APPARATUS FOR ACCIDENTAL NEGLIGENCE EVALUATION OF ACCIDENT IMAGE USING DEEP LEARNING

CROSS-REFERENCE TO RELATED APPLICATIONS

This application is a Continuation of International Application No. PCT/KR2020/014494 filed on Oct. 22, 2020, which claims priority to and the benefit of Korean Patent Application No. 10-2019-0164859 filed in the Korean Intellectual Property Office on Dec. 11, 2019, the entire contents of which are incorporated herein by reference.

BACKGROUND OF THE INVENTION

Field of the Invention

The present disclosure relates to a method and apparatus for split liability assessment and, more particularly, a method and apparatus for split liability assessment of car accident videos using deep learning.

Description of the Related Art

A split liability assessment system is a system that evaluates the split liability of car accidents using recorded videos captured with dash cams installed in cars during the time of the accident. The split liability of an accident is determined by various factors that influence driving of a vehicle such as lanes, traffic lights, and speeds.

In general, a split liability is determined by agreement of insurance companies' staffs and the concerned persons of the accident, but there is a problem that all of various environmental factors cannot be considered, so a split liability is determined under laws with attorneys, a court, etc. in some cases.

When a split liability is determined by designating an attorney and raising a lawsuit on a court, a large amount of money and time are required. Accordingly, split liability is usually subjectively determined on the basis of agreement of insurance companies' staffs and the persons concerned in the accident.

As for the police, a CSI secures several black box videos, reconstructs an accident situation, and then investigates the accident. In this case, there is a problem that it takes time to secure several black box videos and reconstruct an accident.

SUMMARY OF THE INVENTION

The present disclosure has been made in an effort to solve the problems and an objective of the present disclosure is to provide a method and apparatus for split liability assessment of a car accident video using deep learning.

Another objective of the present disclosure is to provide a method and apparatus for split liability assessment for training an accidental split liability determination model using car accident video learning data and split liability learning data.

Another objective of the present disclosure is to provide a method and apparatus for split liability assessment for outputting accidental split liability information by applying car accident video data to an accidental split liability determination model.

The objectives of the present disclosure are not limited to those described above and other objectives may be made apparent to those skilled in the art from claims.

In order to achieve the objectives, a method for split liability assessment of a car accident video using deep learning according to an embodiment of the present disclosure may include: (a) obtaining car accident video data; and (b) outputting accidental split liability information by applying the obtained car accident video data to an accidental split liability determination model.

In an embodiment, the method for split liability assessment may further include: before the step (b), obtaining car accident video learning data and split liability learning data corresponding to the car accident video learning data; and training the accidental split liability determination model using the car accident video learning data and the split liability learning data.

In an embodiment, the step (b) may include: outputting a feature map from the car accident video data using the accidental split liability determination model; and outputting the accidental split liability information on the basis of the feature map.

In an embodiment, the outputting of a feature map may include: extracting at least one of time information and space information from the car accident video data using the accidental split liability determination model; and outputting the feature map on the basis of at least one of the time information and the space information.

In an embodiment, the accidental split liability information may include an accidental split liability.

In an embodiment, the method for split liability assessment may further include: before the step (b), obtaining the gaze direction of the driver of a vehicle producing the car accident video data; and outputting a negligence intention score in accordance with whether the driver is taking appropriate controlling measures to avoid the collision or if the driver is intentionally driving the car for imminent collision.

In an embodiment, the method for split liability assessment may further include giving a stronger weight to the negligence intention score if the preventive control of the vehicle is not made to avoid the colliding path of the other vehicle during the time when the direction of the gaze is paying full attention to the motion of the other vehicle.

In an embodiment, the step (b) may include outputting the accidental split liability information by applying at least one of the negligence intention score and the weight, and the car accident video data to the accidental split liability determination model.

In an embodiment, an apparatus for split liability assessment of a car accident video using deep learning may include: an input unit obtaining car accident video data; and a control unit outputting accidental split liability information by applying the obtained car accident video data to an accidental split liability determination model.

In an embodiment, the input unit may obtain car accident video learning data and split liability learning data corresponding to the car accident video learning data, and the control unit may train the accidental split liability determination model using the car accident video learning data and the split liability learning data.

In an embodiment, the control unit may output a feature map from the car accident video data using the accidental split liability determination model, and output the accidental split liability information on the basis of the feature map.

In an embodiment, the control unit may extract at least one of time information and space information from the car accident video data using the accidental split liability determination model, and output the feature map on the basis of at least one of the time information and the space information.

In an embodiment, the accidental split liability information may include an accidental split liability.

In an embodiment, the apparatus for split liability assessment of a car accident video using deep learning may further include a sensor unit obtaining a position of a gaze of a driver of a vehicle for the car accident video data, in which the control unit may output a negligence intention score in accordance whether the direction of the gaze is paying required attention to the motion of another vehicle.

In an embodiment, the control unit may give a stronger weight to the negligence intention score if the preventive control of the vehicle is not made to avoid the colliding path of the other vehicle during the time when the direction of the gaze is paying full attention to the motion of the other vehicle.

In an embodiment, the control unit may output the accidental split liability information by applying at least one of the negligence intention score and the weight, and the car accident video data to the accidental split liability determination model.

Details for achieving the objectives would be made clear by referring to the following embodiments to be described with the accompanying drawings.

However, the present disclosure is not limited to the embodiments disclosed hereafter and may be configured in various other ways, which is provided to complete the present disclosure and completely inform those having common knowledge in the art (hereafter, "those skilled in the art") of the range of the present disclosure.

According to an embodiment of the present disclosure, by outputting accidental split liability information by applying car accident video data to the accidental split liability determination model, it is possible to increase reliability using split liability measurement data mutually agreed by attorneys or laws at the side of a third party.

Further, according to an embodiment of the present disclosure, it is possible to design the accidental split liability determination model to be easy even to normal people who don't know about Road Traffic Act.

Further, according to an embodiment of the present disclosure, for minor accidents, it is possible to simply replace an attorney with the split liability calculated through the present disclosure.

Further, according to an embodiment of the present disclosure, a car sharing company, an insurance company, an attorney, etc. can quickly make determination when calculating a split liability and to reduce time when processing a business through the present disclosure.

The effects of the present disclosure are not limited to the effects described above, and provisional effects that are expected from the technical features of the present disclosure would be clearly understood from the following description.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

The present disclosure may be modified in various ways and implemented by various exemplary embodiments, so that specific exemplary embodiments are shown in the drawings and will be described in detail.

Various features of the present disclosure disclosed in claims will be better understood in consideration of drawings and detailed description. An apparatus, a method, a manufacturing method, and various embodiments disclosed in the specification are provided for examples. The disclosed structure and functional features are provided for those skilled in the art to be able to implement various embodiments in detail rather than limiting the scope of the present disclosure. The disclosed terms and sentences are provided to easily explain the features of the present disclosure rather than limiting the scope of the present disclosure.

In describing the present disclosure, detailed descriptions of well-known technologies will be omitted so as not to obscure the description of the present disclosure with unnecessary detail.

Hereafter, a method and apparatus for split liability assessment of a car accident video using deep learning according to an embodiment of the present disclosure is described.

Figure 1:
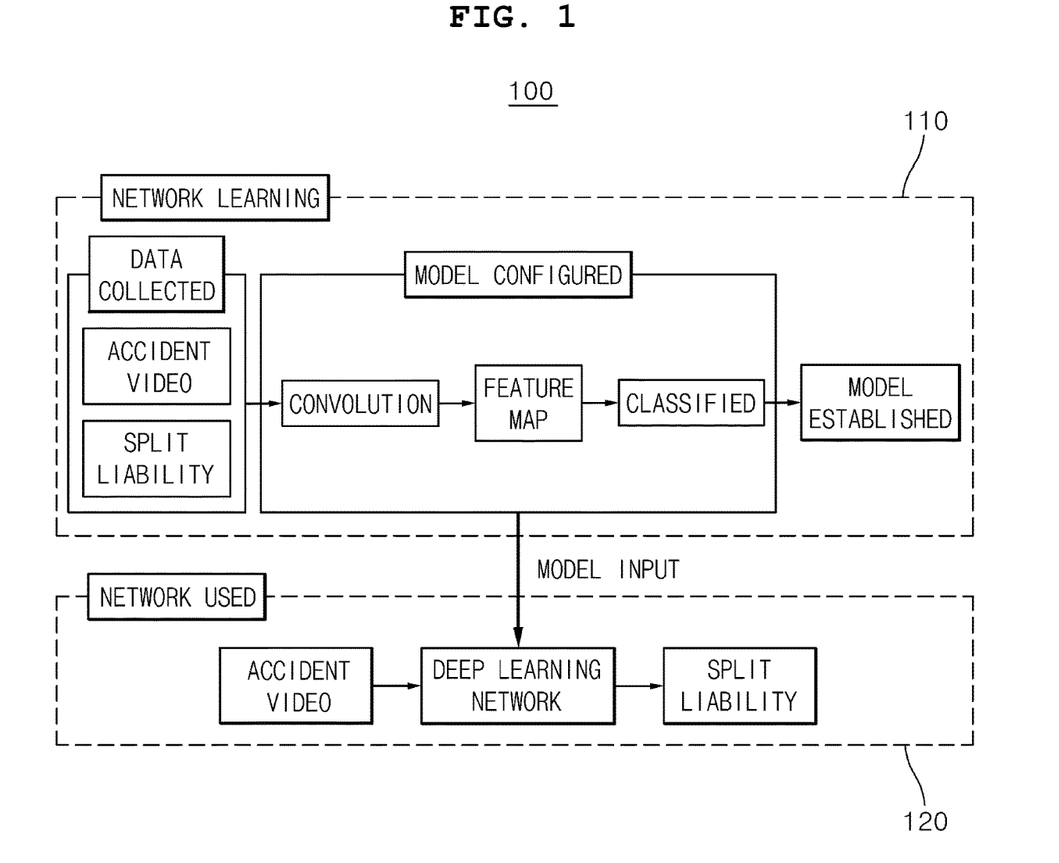
FIG. 1 is a diagram showing a process of evaluating accidental split liability from a car accident video using deep learning according to an embodiment of the present disclosure.

FIG. 1 is a diagram showing a process 100 of evaluating accidental split liability from a car accident video using deep learning according to an embodiment of the present disclosure.

Referring to FIG. 1, the process 100 of evaluating accidental split liability from a car accident video using deep learning may include a learning process 110 of an accidental split liability determination model and an evaluation process 120 of the accidental split liability determination model.

In the learning process 110, it is possible to obtain car accident video learning data and split liability learning data corresponding to the car accident video learning data. For example, the car accident video learning data may be included in a recorded image attached to the front of a vehicle and a recorded image attached to the rear of the vehicle.

Further, in the learning process 110, an accidental split liability determination model is trained using input car accident video learning data and split liability learning data, that is, using the split liability of a vehicle of which a car accident video is taken as a correct answer. That is, the accidental split liability determination model may be trained on the basis of deep learning.

Further, in the learning process 110, in order to evaluate an accidental split liability, space information such as a traffic light and lanes and time information such as a speed and state information before an accident included in the car accident video learning data may be used. Accordingly, the accidental split liability determination model may use a deep learning network that can learn both the space information and time information.

That is, the accidental split liability determination model according to the present disclosure can perform learning such that output values (split liabilities) according to input information (car accident videos) are same.

In the evaluation process 120, when car accident video data are input, it is possible to determine accidental split liability information (e.g., a split liability) using a training-completed accidental split liability determination model.

For example, when dash cam videos having an accident situation is input to the accidental split liability determination model, a split liability can be measured.

Figure 2A:
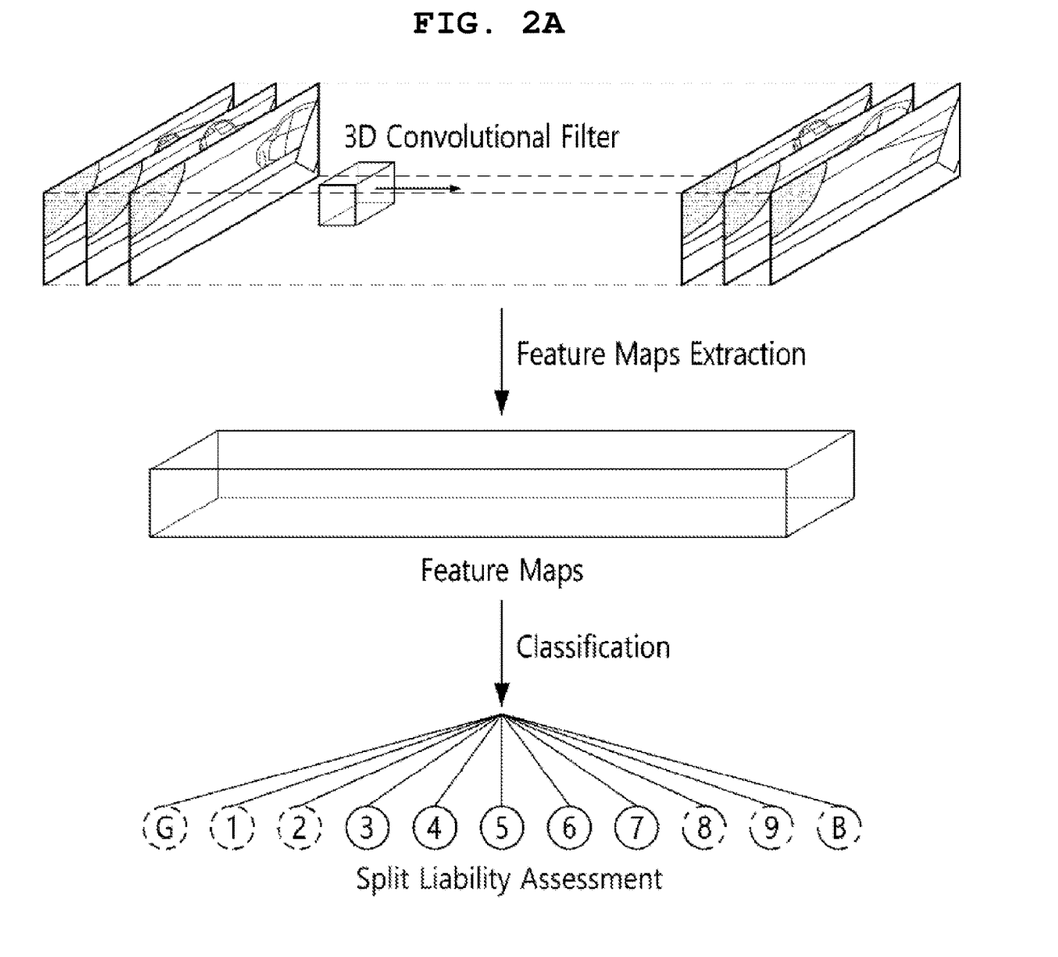
FIG. 2A is a diagram showing an accidental split liability determination model based on deep learning according to an embodiment of the present disclosure.
Figure 2B:
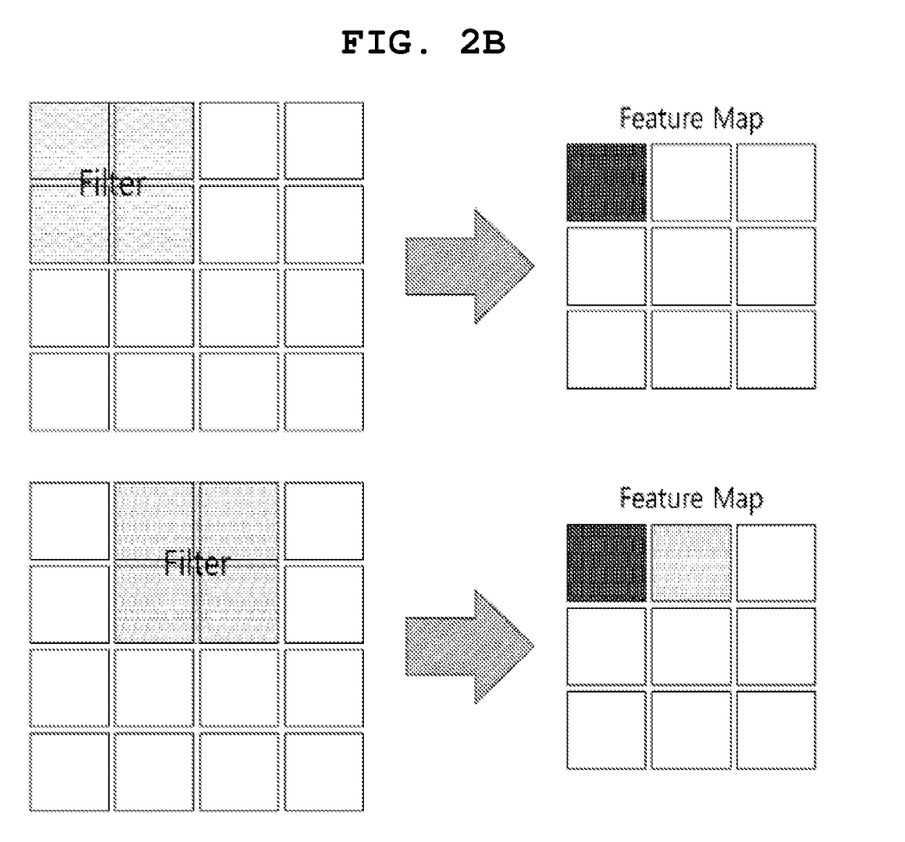
FIG. 2B is a view showing an example of extracting characteristics according to an embodiment of the present disclosure.

FIG. 2A is a diagram showing an accidental split liability determination model based on deep learning according to an embodiment of the present disclosure. FIG. 2B is a view showing an example of extracting characteristics according to an embodiment of the present disclosure.

Referring to FIG. 2A, when car accident video data are a video, the input video is an image composed of several frames. That is, a video may be shown as a combination of several frame images.

In this case, the accidental split liability determination model according to the present disclosure can create a feature map by extracting features by performing convolution in one frame. Since convolution is performed in a single frame, a loss of time information may be generated.

Referring to FIG. 2B, corresponding convolution may be expressed on a 2D image. In this case, a filter extracts features while going around the pixels of an image shown by a white cooler, thereby being able to create a feature map as output.

In this case, in FIG. 2B, extracting a feature map from a single frame is shown. Accordingly, the filter may be expressed as a simple rectangle.

In an embodiment, 3D convolution is extracting a feature map from several frames, so the shape of the filter may be expressed as a rectangular parallelepiped shape.

Referring to FIGS. 2A and 2B, the accidental split liability determination model according to the present disclosure may be trained including both space information and time information. That is, it is a method of convoluting several frames rather than a single frame. It is possible to determine whether there is split liability by extracting even the information before a collision through this method.

In an embodiment, extracting a feature map from a single frame or multiple frames may use neural networks other than 2D or 3D convolutions such as transformers that use the mechanism of self-attention or recurrent neural networks.

In an embodiment, the feature map can include intermediate or final representations in a form of natural language texts. In such cases, the extracting a feature map can be done using techniques such as image to text or video to captions.

The accidental split liability determination model according to the present disclosure can determine accidental split liability by applying a network that can divide accidental split liability into 11 stages at the rear portion of a feature map. For example, an output of the accidental split liability determination model may be shown as an accidental split liability (0-100%).

A learning process may mean a process of preventing a difference between a value output through the accidental split liability determination model and an input split liability by comparing the two values. That is, the accidental split liability determination model according to the present disclosure is a model that is trained in the way of gradually reducing the difference between a correct answer and an expected value.

In a split liability evaluation process, when car accident video data (e.g., black box image) are input to a trained accidental split liability determination model, a split liability for the accidental image data can be output.

Figure 3:
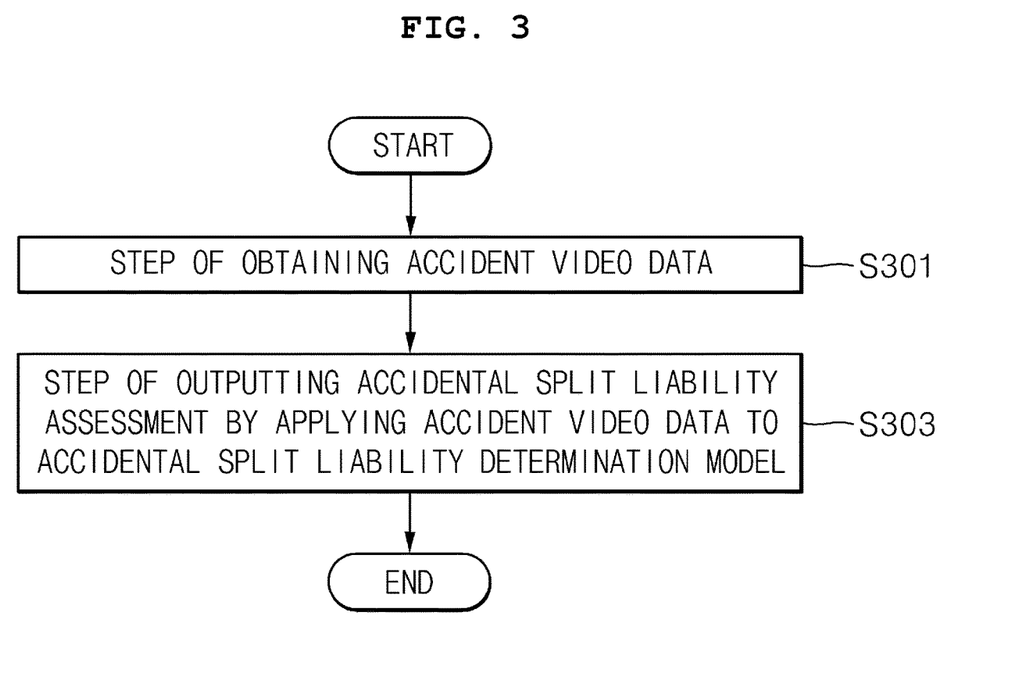
FIG. 3 is a diagram showing a method for split liability assessment of a car accident video using deep learning according to an embodiment of the present disclosure.

FIG. 3 is a diagram showing a method for split liability assessment of a car accident video using deep learning according to an embodiment of the present disclosure.

Referring to FIG. 3, in an embodiment, in the learning process of the accidental split liability determination model, before step S303, car accident video learning data and split liability learning data corresponding to the car accident video learning data are obtained and the accidental split liability determination model can be trained using the car accident video learning data and the split liability learning data.

Step S301 is a step of obtaining car accident video data.

Step S303 is a step of outputting accidental split liability information by applying the obtained car accident video data to the accidental split liability determination model.

In an embodiment, it is possible to output a feature map from the car accident video data using the accidental split liability determination model and to output accidental split liability information on the basis of the feature map.

In an embodiment, it is possible to extract at least one of time information and space information from the car accident video data using the accidental split liability determination model and to output a feature map on the basis of at least one of the time information and the space information.

In an embodiment, the accidental split liability information may include an accidental split liability.

In an embodiment, before step S303, it is possible to obtain the position of a gaze of a driver of a vehicle for car accident video data and it is possible to output a negligence intention score in accordance with whether the direction of the gaze is paying full attention to the motion of the other vehicle.

In an embodiment, after the negligence intention score is output, when the direction of the gaze is fully covering the other vehicle, it is possible to give a weight to the negligence intention score in accordance with whether the driver is taking appropriate controlling measures to avoid the collision or if the driver is intentionally driving the car for imminent collision.

In this case, it is possible to output accidental split liability information by applying at least one of the negligence intention score and the weight, and the car accident video data to the accidental split liability determination model.

In an embodiment, subjective opinions of stakeholders who are in charge of handling various traffic accidents such as a car sharing company, an insurance company, and an attorney may be included in split liability measurement. Therefore, according to various embodiments, by outputting accidental split liability information by applying car accident video data to the accidental split liability determination model, it is possible to increase reliability using split liability measurement data mutually agreed by attorneys or laws at the side of a third party.

Further, according to the present disclosure, it is possible to design the accidental split liability determination model to be easy even to normal people who don't know about Road Traffic Act.

Further, according to the present disclosure, for minor accidents, it is possible to simply replace an attorney with the split liability calculated through the present disclosure.

Further, according to the present disclosure, a car sharing company, an insurance company, an attorney, etc. can quickly make determination when calculating a split liability and to reduce time when processing a business through the present disclosure.

Figure 4:
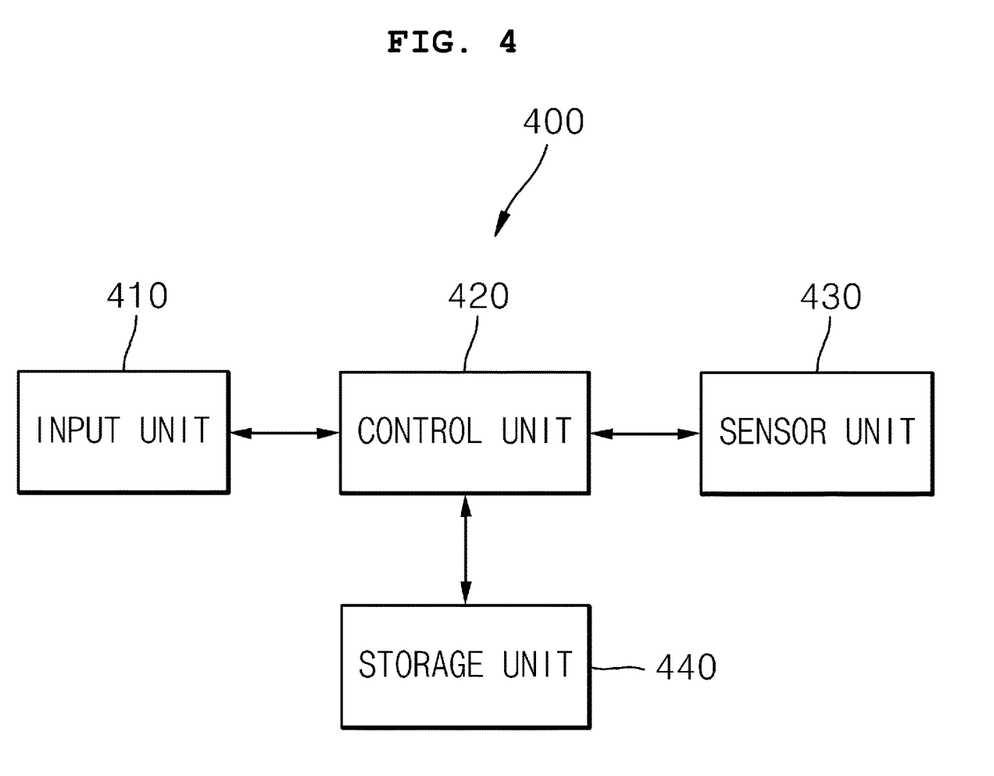
FIG. 4 is a diagram showing the functional configuration of an apparatus for split liability assessment of a car accident video using deep learning according to an embodiment of the present disclosure.

FIG. 4 is a diagram showing the functional configuration of an apparatus 400 for split liability assessment of a car accident video using deep learning according to an embodiment of the present disclosure.

Referring to FIG. 4, the apparatus 400 for split liability assessment may include an input unit 410, a control unit 420, a sensor unit 430, and a storage unit 440.

The input unit 410 can obtain car accident video data. In an embodiment, the input unit 410 may be implemented as a camera when car accident video data are picture images and may be implemented as a video camera when car accident video data are a video. In an embodiment, the input unit 410 may be implemented as a transceiver or a communicator when car accident video data are received from an external electronic device through a communication network.

The control unit 420 can output accidental split liability information by applying the obtained car accident video data to an accidental split liability determination model.

In an embodiment, the control unit 420 may include at least one processor or microprocessor, or may be a part of a processor. Further, the control unit 420 may be referred to as a Communication Processor (CP). The control unit 420 can control operation of the apparatus 400 for split liability assessment according to various embodiments of the present disclosure.

The sensor unit 430 can obtain the position of the gaze of a driver of a vehicle for car accident video data.

The storage unit 440 can store car accident video data, car accident video learning data, and split liability learning data. Further, the storage unit 440 can store a training-completed accidental split liability determination model. Further, an embodiment, the storage unit can store a negligence intention score, a weight applied to the negligence intention score, and accidental split liability information.

In an embodiment, the storage unit 440 may be a volatile memory, a nonvolatile memory, or a combination of a volatile memory and a nonvolatile memory. Further, the storage unit 440 can provide the kept data in response to a request from the control unit 420.

Referring to FIG. 4, the apparatus 400 for split liability assessment may include an input unit 410, a control unit 420, a sensor unit 430, and a storage unit 440. In various embodiments of the present disclosure, the apparatus 400 for split liability assessment does not necessarily include the components shown in FIG. 4, so it may include more or less components than those shown in FIG. 4.

The above description is only exemplary description of the spirit of the present disclosure and the present disclosure may be changed and modified by those skilled in the art in various ways without departing from the fundamental characteristics of the present disclosure.

Accordingly, the embodiments described herein are provided merely not to limit, but to explain the spirit of the present disclosure, and the spirit of the present disclosure is not limited by the embodiments.

The protection range of the present disclosure should be construed on the basis of claims and all spirits that are considered as being same or equivalent to the protection range should be construed as being included in the right range of the present disclosure.

What is claimed is:

1. A method for split liability assessment of an car accident video using deep learning, performed by a processor, the method comprising:
   obtaining, by the processor, car accident video learning data and split liability learning data corresponding to the car accident video learning data;
   performing, by the processor, machine learning of an accidental split liability determination model by using the car accident video learning data and the split liability learning data;
   obtaining, by the processor, car accident video data composed of a plurality of frames, recorded by a camera attached to the front or the rear of a vehicle; and
   generating, by the processor, feature maps from the car accident video data using the accidental split liability determination model,
   wherein the generating the feature maps comprises:
   generating the feature maps of the plurality of frames of the car accident video by performing 3D convolution in several frames of the plurality of frames using a 3D filter having a rectangular parallelepiped shape; and
   outputting, by the processor, accidental split liability information on the basis of the feature maps, and
   wherein the accidental split liability information indicates a particular liability level corresponding to the car accident video data, among a plurality of liability levels.

2. The method of claim 1, wherein the accidental split liability information includes an accidental split liability.

3. The method of claim 1, further comprising: before the generating the feature maps,
   obtaining, by the processor, a position of a gaze of a driver of a vehicle from a sensor in the vehicle; and
   outputting, by the processor, a negligence intention score in accordance with whether the direction of the gaze is paying full attention to a motion of an other vehicle, for the car accident video data.

4. The method of claim 3, further comprising setting, by the processor, a stronger weight to the negligence intention score if a preventive control of the vehicle is not made to avoid a colliding path of the other vehicle during the time when the direction of the gaze is paying full attention to the motion of the other vehicle.

5. The method of claim 4, wherein the outputting includes outputting the accidental split liability information by applying at least one of the negligence intention score and the weight, and the car accident video data to the accidental split liability determination model.

6. An apparatus for split liability assessment of an car accident video using deep learning, the apparatus comprising:
   a processor configured to:
   obtain car accident video learning data and split liability learning data corresponding to the car accident video learning data;
   perform machine learning of an accidental split liability determination model by using the car accident video learning data and the split liability learning data;
   obtain car accident video data composed of a plurality of frames, recorded by a camera attached to the front or the rear of a vehicle; and
   generate feature maps from the car accident video data using an accidental split liability determination model,
   wherein the processor is further configured to, in generating the feature maps:
   generate the feature maps of the plurality of frames of the car accident video by performing 3D convolution in several frames of the plurality of frames using a 3D filter having a rectangular parallelepiped shape; and output accidental split liability information on the basis of the feature maps, and wherein the accidental split liability information indicates a particular liability level corresponding to the car accident video data, among a plurality of liability levels.

7. The apparatus of claim 6, wherein the accidental split liability information includes an accidental split liability.

8. The apparatus of claim 6, wherein the processor is further configured to obtain a position of a gaze of a driver of a vehicle from a sensor in the vehicle, wherein the the processor is further configured to output a negligence intention score in accordance with whether the direction of the gaze is paying full attention to a motion of an other vehicle, for the car accident video data.

9. The apparatus of claim 8, wherein the processor is further configured to set a weight to the negligence intention score if a preventive control of the vehicle is not made to avoid a colliding path of the other vehicle during the time when the direction of the gaze is paying full attention to the motion of the other vehicle.

10. The apparatus of claim 9, wherein the processor outputs the accidental split liability information by applying at least one of the negligence intention score and the weight, and the car accident video data to the accidental split liability determination model.

\* \* \* \* \*